Patented Oct. 13, 1925.

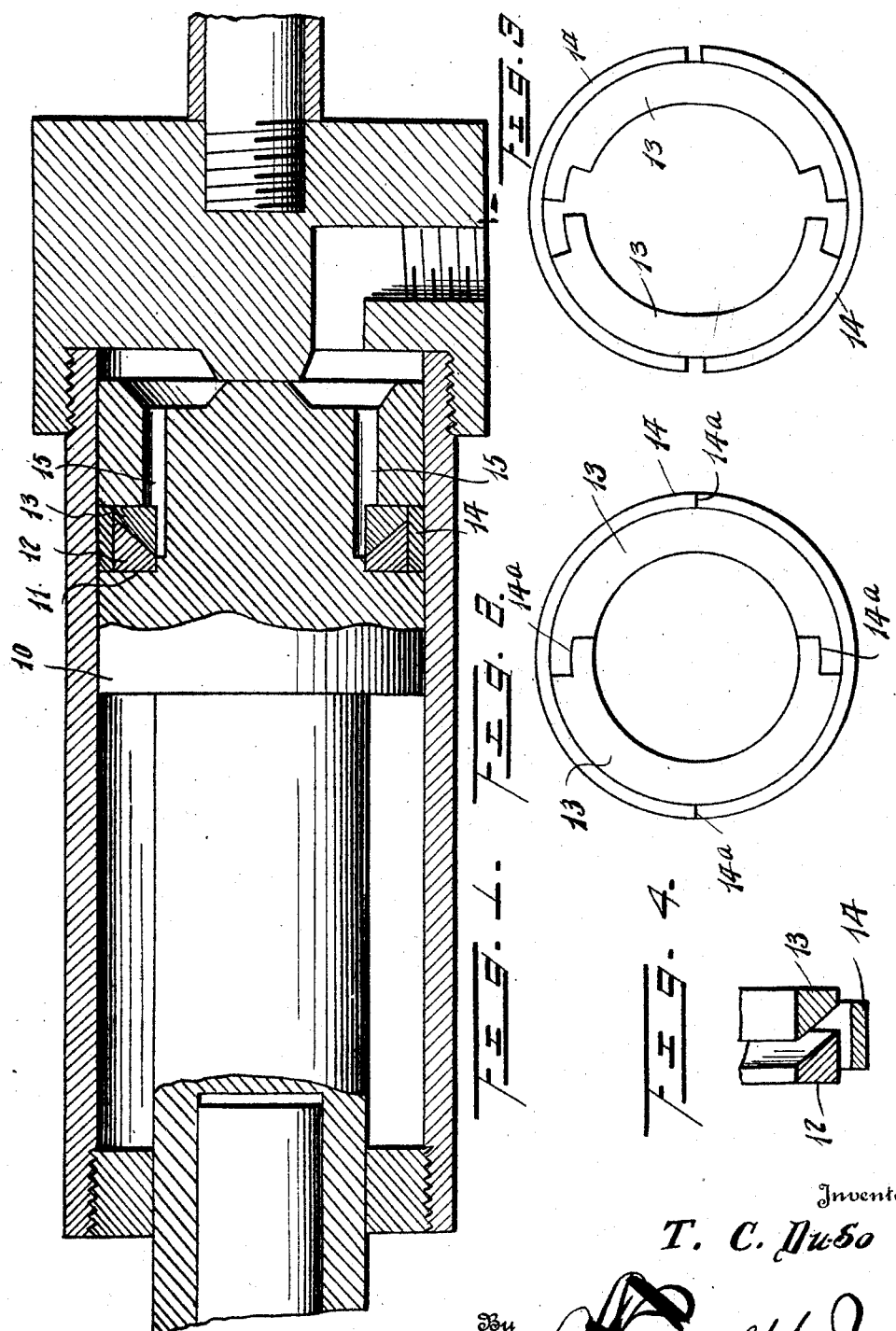

1,557,439

UNITED STATES PATENT OFFICE.

THEODORE C. DU-SO, OF TULSA, OKLAHOMA.

PACKING RING.

Original application filed November 6, 1923, Serial No. 673,117. Divided and this application filed February 5, 1925. Serial No. 7,140.

*To all whom it may concern:*

Be it known that I, THEODORE C. DU-SO, a citizen of the United States, residing at Tulsa, in the county of Tulsa and State of Oklahoma, have invented certain new and useful Improvements in Packing Rings; and I do hereby declare the following to be a full, clear, and exact description of the invention, such as will enable others skilled in the art to which it appertains to make and use the same.

This invention relates to a packing ring.

It is aimed to provide a generally improved construction, particularly one in which wedge sections are used so as to insure intimate contact of the ring with side walls of a groove and coaction with a relatively thin outermost ring section of the width of the groove or wedge sections.

The present invention constitutes a division of that set forth in my application for Letters Patent covering a pneumatic riveting jack, filed November 6, 1923, Serial Number 673,117.

The invention has been embodied in one operative form in accompanying drawing wherein, Figure 1 is a fragmentary view of a piston in longitudinal section showing my improved ring in place, Figure 2 is a view of the ring alone and in plan, Figure 3, a view similar to Figure 2 showing the rings expanded, and Figure 4, a fragmental cross section of the rings.

Referring specifically to the drawing, the invention is shown by way of example as applied to a piston as used in a pneumatic riveting jack. This showing is conventional since the ring is capable of general adaptation in connection with pistons and for instance pistons of internal combustion engines. The piston 10 at its periphery has an annular groove 11.

In said groove 11 a composite spring or packing comprising sections 12, 13 and 14 is disposed. Said sections are preferably of metal and expansible. The sections 12 and 13 are of wedge form in cross section and their meeting faces are obliquely inclined with the result that an outward pressure upon the section 13 causes sections 12 and 13 to move outwardly and laterally, to insure a close contact with the side walls of the groove 11 and to expand the section 12 to insure a close joint between it and the inner wall of the cylinder. Section 14 is relatively thin and of a width corresponding to that of groove 11. All of the elements 12, 13 and 14 are of annular form but each may comprise two or more parts separate from each other or secured together in any desired manner as at the points 14ª.

In the particular embodiment illustrated, openings 15 are arranged so as to supply pressure through operation of the pistons, to the groove 11 so as to expand the metallic packing and prevent loss of pressure. When the pressure is cut off, the packing contracts and the piston returns to normal position.

I claim as my invention:

1. A piston having a packing groove and a composite packing in the groove comprising two rings, placed one against the other with their opposing faces inclined, and a third ring encircling the two rings and corresponding in width to the collective width of said two rings, the three rings fitting snugly between the walls of the groove.

2. A piston packing comprising complemental rings arranged side by side, with their outer faces parallel and their meeting faces inclined, and a third ring encircling the two rings and having its sides flush with the outer sides of the two rings, the three rings being expansible.

3. A ring of the class described having sections substantially rectangular collectively in cross section and contacting along an inclined surface intermediate their flat surfaces, and a relatively thin ring encircling said sections and being of a width corresponding to the collective width of the sections.

In testimony whereof I affix my signature.

THEODORE C. DU-SO.